Patented Nov. 6, 1923.

1,472,778

UNITED STATES PATENT OFFICE.

AUGUST ALBERT, OF MUNICH, GERMANY, ASSIGNOR TO THE ROESSLER & HASSLACHER CHEMICAL COMPANY, OF NEW YORK, N. Y., A CORPORATION OF NEW YORK.

METHOD OF PRODUCING NEW ORGANIC ARSENIC COMPOUNDS.

No Drawing.   Application filed February 26, 1923. Serial No. 621,478.

*To all whom it may concern:*

Be it known that I, AUGUST ALBERT, a citizen of the Republic of Germany, and residing at Munich, Elisabethstrasse 46, have invented certain new and useful Methods of Producing New Organic Arsenic Compounds, of which the following is a specification.

It is well known that the arsonic acid group can be introduced into aromatic compounds by diazotizing but only in those compounds where there is no risk of interaction between the aromatic compound and the arsonic acid which has a strong reducing effect.

I have discovered that by diazotizing arsenic can be introduced also into compounds containing the carbonyl group in spite of this group being easily acted upon by any reducing agent or influence. The arsonic group may therefore be introduced into aromatic or mixed aliphatic-aromatic aldehydes or ketones without the carbonyl group being affected thereby.

The technical importance of this experimental observation consists in the possibility of introducing arsenic into aromatic or mixed aliphatic-aromatic aldehydes or ketones or any substituted derivatives. Thus arsenic compounds are obtained capable of widely varied applications. The constitution of this class of compounds is shown by the following general formula:

In this formula by $R_1$ is meant on the one hand either an unsubstituted aliphatic or aromatic or hydroaromatic radical, or on the other hand an aliphatic, aromatic or hydroaromatic radical substituted in any way (for instance by a halogen, OH, COOH, etc., further by a cyclic radical), by $R_2$ any cyclic (carbocyclic or heterocyclic) radical substituted or unsubstituted.

The process can be carried out for example by starting from a ketone $R_1.CO.R_2.NH_2$. This is diazotized and heated afterwards in presence of an arsenious salt without taking any special precaution.

The reaction may take place in neutral, alkaline or acid solution.

Example 1.

Nitrohydroxy-acetylamido-acetophenone $(CH_3COC_6H_2(OH)(NO_2)(CONH_2))$ (cf. thesis of R. Schmidt, Rostock 1910) is changed into nitro-hydroxy-amidoacetophenone $(CH_3COC_6H_2(OH)(NO_2)(NH_2))$ by boiling with dilute hydrochloric acid. The base is then diazotized in hydrochloric acid solution with sodium nitrite in the ordinary way. After the solution has been made alkaline an excess of sodium arsenite solution is added, the solution separated from the sediment by filtration and the solution concentrated in vacuo. The nitrohydroxyacetophenone-arsenious acid $(CH_3COC_6H_2(OH)(NO_2)(AsO_3H_2))$ separates in needles which recrystallized from glacial acetic acid melt at about 200°.

Example 2.

2.7 g. p-amidoacetophenone are diazotized with sodium nitrite and hydrochloric acid. After being made alkaline a solution of sodium arsenite is added. Here too the action is finished by heating on a water bath. The solution is acidified by means of hydrochloric acid, filtered and the clear solution concentrated after making it slightly alkaline in vacuo. On adding hydrochloric acid the ketone-arsenious acid separates in needles. FP 176°.

Example 3.

2.7 g. p-aminobenzophenone hydrochloride are dissolved in about 60 cc. water and 3 cc. hydrochloric acid (1.19) and diazotized with 0.75 g. sodium nitrite in 4 cc. water in the usual way. On adding 30 cc. n-NaOH solution and 20 cc. of a solution containing sodium arsenite (1.5) at once a strong evolution of nitrogen is noticed. By heating the reaction is finished. When after filtration the clear solution is acidified with hydrochloric acid, the benzophenonemonoarsenious acid separates in crystals melting at 195–197°.

Example 4.

In the same way the corresponding benzophenonediarsenious acid is obtained from diamido-benzophenone (formed by nitrating amino-benzophenone and reducing the derivative). The acid may be crystallized from water and melts at 260°.

Example 5.

3.6 p-amidobenzaldehyde are diazotized in the ordinary way with sodium nitrite and hydrochloric acid. The diluted solution is then made alkaline with soda lye. On adding a solution of sodium arsenite large evolution of nitrogen sets in. The reaction is finished by heating on a water-bath. After adding an excess of hydrochloric acid the sediment is filtered off and the solution evaporated to dryness in vacuo. From the residue the arsenious acid is extracted by means of alcohol. After evaporation the often oily residue is stirred with a little water. The p-aldehyde-phenyl arsenious acid crystallizes out in needles.

The presence of the carbonyl group is shown by the reaction with phenyl-hydrazin, the phenyl-hydrazone thereby being formed.

What I claim is:

1. Method of producing new organic arsenic compounds consistign in diazotizing mixed aliphatic-aromatic compounds containing reactive amino and carbonyl groups and treating the resulting body with an arsenite.

2. Method of producing new organic arsenic compounds consisting in diazotizing aromatic mono- or polyamidised compounds, containing reactive carbonyl groups and treating the resulting body with an arsenite.

In testimony whereof I have signed my name to this specification in the presence of two subscribing witnesses.

AUGUST ALBERT.

Witnesses:
 VALENTINE WEICKEL,
 C. C. L. B. WYLES.

Certificate of Correction.

It is hereby certified that in Letters Patent No. 1,472,778, granted November 6, 1923, upon the application of August Albert, of Munich, Germany, for an improvement in "Methods of Producing New Organic Arsenic Compounds," an error appears in the printed specification requiring correction as follows: Page 1, line 35, strike out the formula and insert instead—

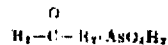

and that the said Letters Patent should be read with this correction therein that the same may conform to the record of the case in the Patent Office.

Signed and sealed this 22d day of January, A. D., 1924.

[SEAL]

KARL FENNING,
*Acting Commissioner of Patents.*